United States Patent Office 3,036,988
Patented May 29, 1962

3,036,988
HOMOGENEOUS BLEND OF A POLYAMIDE AND A POLYVINYL LACTAM AND PROCESS FOR PRODUCING
Robert Herman Knospe, Wilmington, Del., assignor to E. I. du Pont de Nemours and Company, Wilmington, Del., a corporation of Delaware
No Drawing. Filed Apr. 7, 1959, Ser. No. 804,604
13 Claims. (Cl. 260—45.5)

This invention relates to melt blending of condensation and addition polymers. More particularly, it relates to preparing homogeneous melt blends of a polyamide and a polyvinyl lactam and dispersing polystyrene in said blends.

Polyamides, polyvinyl lactams and polystyrene are known in the art. The first two types of polymers have been incompatible in the melt prior to this invention and attempts to blend these two types of polymers have not resulted in a homogeneous and melt-spinnable blend. Polyamides and polystyrene also have been incompatible and adequate dispersions of polystyrene in a polyamide have not been known.

An object of this invention is to provide a homogeneous blend of a polyamide, and a polyvinyl lactam, and a process for preparing this blend.

Another object is to provide a melt-spinnable blend of a polyamide, and a polyvinyl lactam.

A further object is to prepare an improved dispersion of polystyrene in a modified polyamide.

These and other objects will become apparent in the course of the following specification and claims.

These objects are accomplished by adding, with agitation, to a conventional, aqueous solution polyamidation, an aqueous solution of a polyvinyl lactam, the said lactam being added either to the unpolymerized compounds capable of being polymerized to the polycarbonamide, e.g. the salt, the amino acid or the like, or to the resulting polycarbonamide formed therefrom before the degree of polymerization of the polycarbonamide exceeds 40, removing the water by evaporation and completing the polymerization to high molecular weight following conventional techniques. Polystyrene may be dispersed in these blends of said polyamide and polyvinyl lactam, by agitation at elevated temperatures.

The degree of polymerization of the polyamide and the corresponding conditions of temperature and pressure of the system are adjusted so that the polymerizing polyamide and the polyvinyl lactam both remain in aqueous solution until a homogeneous blend is formed. Under conditions below the ranges indicated, the polyvinyl lactam cross-links and separates out.

The degree of polymerization, i.e. the repeating units of the polyamides prepared from diamines and dicarboxylic acids is maintained between about 1 and about 20 and preferably between about 10 and about 20. The degree of polymerization of the polyamides prepared from amino-acids is maintained between about 1 and about 40 and preferably between about 20 and about 40. In the conventional aqueous polymerization these degrees of polymerization are obtained by a temperature in the range of from about 120 to about 270° C. and preferably in the range of from about 215 to about 230° C., under a pressure in the range of from about 100 to about 250 pounds per square inch. The operative range of concentrations of polyvinyl lactam in water depends somewhat on the particular temperature and pressure chosen. Concentrations in the range of from about 10 to about 30% are preferred. Concentrations between about 0.001 and 10% are operable, but are somewhat unpractical since the excess water has to be removed from the polymerizing mixture by bleeding off steam. Concentrations higher than 30% are also operative, but when the concentration exceeds about 70% pumping difficulties may arise, in particular when the polyvinyl lactam has a high molecular weight.

Among the polyvinyl lactams which may be employed in the present process are N-vinylpropiolactam, N-vinylpyrrolidone, N-vinyl-n-valerolactam, N-vinyl caprolactam and homologously related compounds obtained by alkyl substitution of the ring. Polyvinyl pyrrolidone is preferred. The molecular weight of the polyvinyl lactam is not critical. When polyvinyl pyrrolidone is employed suitable average molecular weights include the range from 10,000 to 360,000. The blends prepared by the process of this invention may contain between 0.01 and 30% polyvinyl lactam. From 0.01 and 30% polystyrene may be dispersed into these blends.

Although applicant does not wish to be bound by any particular theory, it is believed that by blending during the polymerization of the polyamide, a part of the polyvinyl lactam becomes chemically attached to the polyamide by grafting, amide interchange, etc. The presence of this chemically bonded component makes the not-bonded components compatible and their mixtures homogeneous.

The following examples are cited to illustrate the invention. They are not intended to limit it in any manner.

*Example I*

A 48% aqueous solution of hexamethylene diammonium adipate (nylon salt) and 0.3 mol percent of a 25% aqueous acetic acid solution (viscosity stabilizer) are charged to an evaporator and concentrated to 60% at atmospheric pressure, which corresponds to a final temperature of about 105° C. The 60% salt solution is transferred to an autoclave with steam atmosphere and heated in the closed autoclave until the steam pressure reaches 250 p.s.i. (requiring about 20 minutes). When this pressure is reached, bleeding off steam is started, maintaining 250 p.s.i. pressure, while the heating is continued until the concentration of salt (degree of polymerization of 1) is 90%, which corresponds to a temperature of 230° C. At this point the charging of 33% by weight of a 30% aqueous solution of polyvinyl pyrrolidone is started and completed over a period of 15 minutes. After the charge is completed, the heating and bleeding off at 250 p.s.i. are continued until the temperature reaches 245° C. At this temperature the pressure reduction is started and continued over a period of about 90 minutes so that the temperature has reached 270° C. when the pressure has been reduced to atmospheric. Heating at atmospheric pressure is continued until 275° C. to complete the polymerization. The autoclave is discharged by bringing it to 100 p.s.i. pressure of inert gas (nitrogen and carbon dioxide) and discharging molten polymer as a ribbon by extrusion through a narrow slit. The ribbon is quenched on a water cooled casting wheel and cut into ½ inch flakes.

The polymer flakes so prepared are homogeneous. A 70 total denier, 34 filament yarn is spun and drawn from these flakes. The yarn has an improved dyeability over 66 nylon, i.e. polyhexamethylene adipamide, and a moisture regain of 7.2% at 75% relative humidity compared with 4.5% for 66 nylon. A finished, plain weave, 76 picks, 120 end taffeta fabric woven from the yarn has a crease set at 26 p.s.i. superheated steam for 2 hours after which the fabric is ironed flat at 140° C. and allowed to recover by soaking in water. The crease recovery (hydrosettability) is found to be 98.1% compared to 83.8% for 66 nylon.

*Example II*

A 60% aqueous solution of epsilon amino caproic acid and 0.3 mol percent of a 25% aqueous acetic acid solution (viscosity stabilizer) are charged to an autoclave with steam atmosphere and heated in the closed autoclave until the steam pressure reaches 250 p.s.i. in about 20 minutes. When this pressure is reached, bleeding off steam is started, maintaining 250 p.s.i. pressure, while the heating is continued until the concentration of salt is 90%, which corresponds to a temperature of 230° C. At this point the charging of 33% by weight of a 30% aqueous solution of polyvinyl pyrrolidone is started and completed over a period of 15 minutes. After the charge is completed, the heating and bleeding off at 250 p.s.i. are continued until the temperature reaches 245° C. At this temperature the pressure reduction is started and continued over a period of about 90 minutes so that the temperature has reached 270° C. when the pressure has been reduced to atmospheric. Heating at atmospheric pressure is continued until 275° C. To remove the unreacted monomer the reaction mixture is agitated for 40 minutes at 275° C. and 2 mm. pressure. The autoclave is discharged as described in Example I and a yarn prepared as described in that example. This yarn has a moisture regain of 7.4% at 75% relative humidity compared to 4.6% for unmodified 6 nylon (polycaproamide). When a fabric of the construction of Example I, prepared from the yarn of this example is tested for hydrosettability as described in Example I, the crease recovery is 93.5% compared to 76.1% for 6 nylon.

*Example III*

A blend of polyhexamethylene adipamide and polyvinyl pyrrolidone is prepared and cut into flake following the technique of Example I. The flake is tumbled with 10 weight percent of preformed polystyrene and screw melt-spun to a 40 total denier 13 filament yarn. This yarn processes with fewer breaks and wraps than a blend of polyhexamethylene adipamide and polystyrene.

*Example IV*

A blend of poly (epsilon amino caproic acid) and polyvinyl pyrrolidone is prepared and cut into flake following the technique of Example II. The flake is tumbled with 10 weight percent of preformed polystyrene and screw melt-spun to a 40 total denier 13 filament yarn. This yarn processes with fewer breaks and wraps than a blend of poly (epsilon amino caproic acid) and polystyrene.

The invention broadly applies to polyamides prepared by reactions of diamines and dicarboxylic acids and polyamides prepared from amino acids or their lactams, e.g. as disclosed in U.S. Patents 2,071,251; 2,071,253; 2,071,250; 2,130,253; 2,130,948; 2,163,636; 2,241,322; 2,241,323 and 2,241,321.

A valuable class of diamines comprises diamines of the general formula:

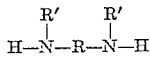

wherein R' is alkyl or hydrogen and R is a divalent hydrocarbon radical free from aliphatic unsaturation and a chain length of at least 2 carbon atoms. Especially useful within this group are diamines in which R is $(CH_2)_x$ wherein $x$ is at least 4 and not greater than 10. Another valuable class of diamines comprises diamines of the general formula:

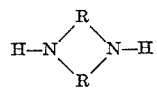

wherein R is defined as above. Especially useful within this class is piperazine.

A valuable class of dicarboxylic acids are the dicarboxylic acids of the general formula:

wherein R" is a divalent hydrocarbon radical free from aliphatic unsaturation with a chain length of at least 3 carbon atoms. Especially useful within this group are the dicarboxylic acids wherein R" is $(CH_2)_y$ wherein $y$ is at least 3 and not greater than 8.

The polyamides so prepared are polycarbonamides wherein the amide linkages are an integral part of the main polymer chain; they have the repeating units:

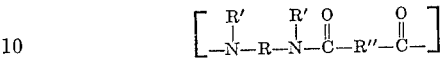

or

wherein R, R' and R" are as defined above and R''' is $(CH_2)_z$ and $z$ is a whole number of from 4 to 11.

Among the nylons prepared from amino acids a particularly valuable one for the application of this invention is the one prepared by polymerization of omega-amino caproic acid or its lactam epsilon-caprolactam.

Many equivalent modifications of the above will be apparent to those skilled in the art from a reading of the above without a departure from the inventive concept.

What is claimed is:

1. A process which comprises mixing (*a*) an aqueous solution of a polyvinyl lactam and (*b*) a member of the class consisting of (1) a non-polymerized compound capable of being polymerized to a polycarbonamide and (2) a polycarbonamide having a degree of polymerization of from about 2 to about 40, the said polycarbonamide being characterized by carbonamide linkages as an integral part of the polymer chain, with the proviso that where the said polycarbonamide is formed by condensation of a diamine and a dicarboxylic acid the degree of polymerization is no greater than about 20 and thereafter polymerizing the said reactants to a fiber-forming molecular weight at a temperature of at least about 120° C. under varying pressure to confine the initial reactants and thereafter remove by-products.

2. The process of claim 1 wherein the polyamide is formed from a diamine and a dicarboxylic acid and the aqueous solution of polyvinyl lactam is added when the degree of polymerization of the polyamide is between about 10 and about 20.

3. The process of claim 1 wherein the polyamide is formed from an amino acid and the aqueous solution of polyvinyl lactam is added when the degree of polymerization of the polyamide is between about 20 and about 40.

4. The process of claim 1 wherein the polyamide is formed from hexamethylene diamine and adipic acid.

5. The process of claim 1 wherein the polyamide is formed from epsilon-amino caproic acid.

6. The process of claim 1 wherein the polyvinyl lactam is polyvinyl pyrrolidone.

7. A process which comprises mixing the melt of polystyrene and the melt of the polymer formed by the process of claim 1.

8. A composition of matter comprising polystyrene and the polymer formed by the process of claim 1.

9. The composition of claim 8 wherein the polyamide is polyhexamethylene adipamide.

10. The composition of claim 8 wherein the polyamide is polycaproamide.

11. The composition of claim 8 wherein the polyvinyl lactam is polyvinyl pyrrolidone.

12. The product of claim 8 in the form of a yarn.

13. The yarn of claim 12 in the form of a fabric.

References Cited in the file of this patent

UNITED STATES PATENTS 2,682,526    Flory                June 29, 1954